United States Patent
Chang et al.

(10) Patent No.: US 7,103,123 B2
(45) Date of Patent: Sep. 5, 2006

(54) ADAPTIVE EQUALIZER

(75) Inventors: Chin-Chi Chang, Feng yuan (TW); Chu-Yu Hsiao, Taichung (TW); Yu-En Tzeng, Hsin Tien (TW); Ming-Yu Wu, Hsin Tien (TW)

(73) Assignee: VIA Technologies, Inc., Taipei (TW)

( * ) Notice: Subject to any disclaimer, the term of this patent is extended or adjusted under 35 U.S.C. 154(b) by 700 days.

(21) Appl. No.: 10/206,227

(22) Filed: Jul. 29, 2002

(65) Prior Publication Data

US 2003/0026334 A1    Feb. 6, 2003

(30) Foreign Application Priority Data

Aug. 1, 2001    (TW) ............................... 90118815 A

(51) Int. Cl.
*H04B 1/10*    (2006.01)

(52) U.S. Cl. ..................................... 375/350
(58) Field of Classification Search ........ 375/230–236, 375/350; 708/323; 333/18, 28 R
See application file for complete search history.

(56) References Cited

U.S. PATENT DOCUMENTS

| 4,433,425 | A | * | 2/1984 | de Jaeger | 375/364 |
| 4,621,366 | A | * | 11/1986 | Cain et al. | 375/222 |
| 6,614,842 | B1 | * | 9/2003 | Chou et al. | 375/232 |
| 6,798,828 | B1 | * | 9/2004 | Phanse | 375/219 |

* cited by examiner

*Primary Examiner*—Don N. Vo
(74) *Attorney, Agent, or Firm*—Bacon & Thomas, PLLC

(57) ABSTRACT

This invention discloses an adaptive equalizer disposed on the front end of a receiver to improve the quality of a transmission signal comprising a data signal from a transmission cable. The signal compensation of the adaptive equalizer uses a long T as its observation unit when the transmission cable is idle, and uses a short T as its observation unit when the transmission cable is transmitting data signals. This invention further discloses a baseline wander compensator worked with the adaptive equalizer during the transmitting data period of the transmission cable. The disclosed adaptive equalizer can achieve its optimal processing effects.

7 Claims, 5 Drawing Sheets

ADAPTIVE EQUALIZER

BACKGROUND OF THE INVENTION

1. Field of Invention

The invention relates to a receiving structure of a data communication system. More particularly, the invention relates to an adaptive equalizer provided on the front end of a receiver that compensates for signal attenuation and signal degradation in the receiving end of a data communication system.

2. Related Art

Data communications refer to the information transmission on a communication medium. For example, the communication medium is air in a wireless communication system, optical fibers in an optical communication network, and coaxial cables in a wire communication system. The transmitted information on such communication media can be digital or analog data.

In a wire communication system, the data transmission of an ordinary wire communication device requires a transmitter 1. The transmitter 1 is connected to a receiver 2 through a transmission cable 3. As shown in FIG. 1, the Ethernet has a transmission cable 3 shorter than 100 m. In an equivalent circuit of FIG. 1, the transmission cable 3 can be viewed as a low-pass filter. Therefore, the low frequency threshold of the transmission cable 3 will lose data. For example, a long continuous and identical transmission signal is in fact a low frequency analog signal, which is cut off by transformers during transmissions. To alleviate this margin effect, the transmitted signal pulses should avoid low frequency components as possible. However, the transmitted signal on the transmission cable 3 still contain low frequency components actually, which results in low frequency degradation on the receiver 2, so that the received signals have the so-called baseline wander effect.

The baseline wander effect refers to the phenomenon that the ground level of the transmission cable 3 deviates from the ideal ground level. When the baseline wander effect happens, the data transmitted on the transmission cable 3 contains DC components. Therefore, the front end of the receiver 2 is further installed a baseline wander compensator to compensate for the signal losses. In the prior art, the baseline wander compensator always detects the incoming signal from the transmission cable 3 and performs baseline wander compensations.

Moreover, to couple different transmission cables 3 to the receiver 2, the front end of the receiver 2 also contains an equalizer with gain control to provide appropriate amplitude and/or phase compensations for the incoming signals. According to the prior art, the equalizer of the receiving end takes a long T period of time as its observation unit, which is usually 500 ns and the worst case is 57 bit time, as shown in FIG. 2. When the high frequency signal is not good, the equalizer still uses long T as its observation unit which is not able to effectively compensate for the high frequency component. The signal jitters become worse. Furthermore, the prior art simultaneously activates an equalizer and a baseline wander compensation circuit at the front end of the receiver 2. After the incoming signals are detected, the equalizer and the baseline wander compensation circuit are simultaneously enabled for operations, so that the two compensation devices work independently. Therefore, the gain control of the equalizer using long T as its observation unit and the compensation effects of the baseline wander compensator also using long T as its observation unit may cancel with each other and are thus unable to achieve the expected compensation effects.

Accordingly, the invention provides a receiver that determines when the equalizer and the baseline wander compensator should perform compensations for incoming signals by judging whether the incoming signal amplitude reaches a predetermined threshold and a compensation method used on the receiver. Thus, the invention can increase the efficiency of the equalizer and the baseline wander compensator.

SUMMARY OF THE INVENTION

An objective of the invention is to provide an adaptive equalizer disposed on the front end of a receiver used in a data communication system that compensates for high and low frequency signals to improve the quality of a transmission signal comprising a data signal from a transmission cable.

An another objective of the invention is to provide a receiver used in a data communication system that controls both an adaptive equalizer and a baseline wander compensator to compensate the signal attenuation and degradation problems of a transmission cable.

In view of the signal attenuation and degradation problems, both an equalizer and a baseline wander compensator using long T as its observation unit are used in the receiver of the conventional wire communication system to perform compensations once incoming signals are detected, such design that, however, still cannot achieve the expected compensation effects. To solve the above problem, the invention employs an adaptive equalizer and a baseline wander compensator in front of the receiver of the wire communication system to improve the quality of the output signals. Before detecting incoming signals on the transmission cable, the adaptive equalizer is enabled to use long T as an observation unit of time to compensate low frequency gain. Until the detected incoming signals are linked OK, the adaptive equalizer is enabled to use a short T as an observation unit to efficiently compensate for high frequency gain so that the adaptive equalizer can obtain optimal processing effects. In addition, the baseline wander compensator used in front of the receiver is enabled only after the detected incoming signals are linked OK and uses a short T as the observation unit to compensate for signal attenuation, thus the efficiency of the baseline wander compensator is improved.

Furthermore, during the link procedure of the transmission cable, if the receiver cannot lock the seed code, then the baseline wander compensator will be shut down to restart its connection mechanism.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 3:
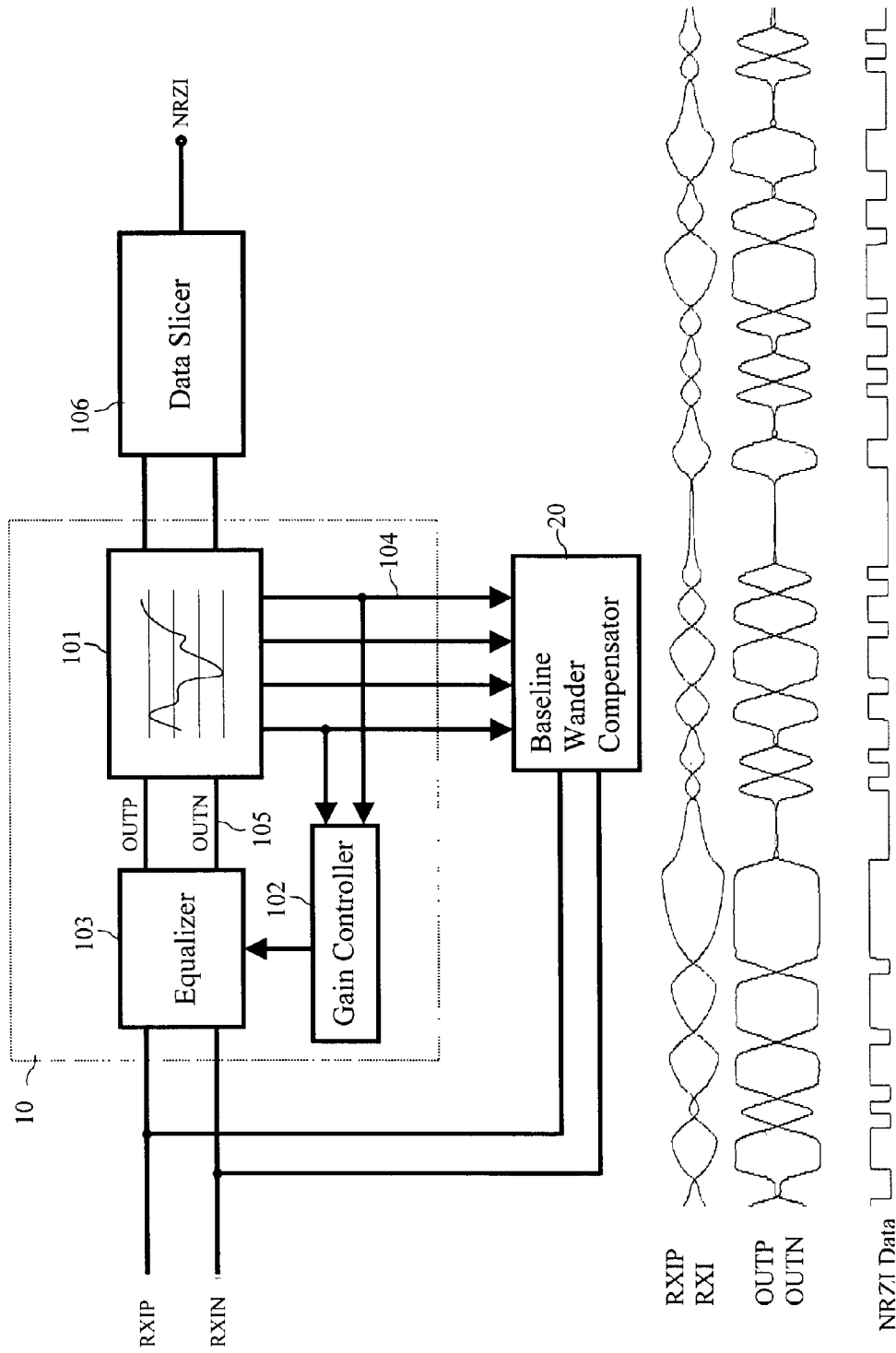
FIG. 3 shows a circuit block diagram and a signal waveform of the disclosed receiver according to the present invention.

Please refer to FIG. 3, the disclosed invention contains an adaptive equalizer 10 and a baseline wander compensator 20 in front of the receiver to improve the signal quality. In the embodiment of the present invention, a receiver for receiving a transmission signal comprising a data signal from a transmission cable, comprises a baseline wander compensator 20 and an adaptive equalizer 10. The baseline wander compensator 20 is enabled for operations after the transmission cable 3 starts to transmit data to improve the baseline wander effects of the transmission cable 3. The adaptive equalizer 10 can adaptively equalize the signals received by the transmission cables 3 with different lengths and characteristics, and selectively use a long T or a short T as its observation unit to compensate the high and low frequency gain of the signal respectively. An embodiment of the invention is implemented in a 100base-T Fast Ethernet communication system, whose protocol is defined by the IEEE 802.3 standards. During a link state, an idle pattern is generated every predetermined period. For example, when the communication device is during in an auto-negotiation period, FLP (Fast Link Pulse) or NLP (Normal Link Pulse) are generated on the transmission cable 3, which periodically scrambles continuous "1". According to the disclosed receiver, the adaptive equalizer 10 in the front contains a peak detector 101, a gain controller 102, and an equalizer 103. The peak detector 101 receives incoming signals RXIP and RXIN on the transmission cable 3. The long T (500 ns) or short T (80 ns) observation unit is employed to detect whether the signal waveform reaches a predetermined threshold to output an indication signal 104. The gain control 102 receives the indication signal 104 from the peak detector 101. The equalizer 103 receives a gain controller signal output from the gain control 102 to increase or reduce the gain compensation and outputs signals 105 OUTP and OUTN.

In more detail, the adaptive equalizer adaptively equalizes a transmission signal. During an unlinked period, the adaptive equalizer uses a first predetermined time unit 500 ns to perform observation, while during a link period, it uses a second predetermined time unit 80 ns to perform observation for compensating the transmission signal.

With reference to the signal waveform shown in FIG. 3, the incoming signals RXIP and RXIN are compensated with gain by the adaptive equalizer 10 to obtain the output signals OUTP and OUTN. The output signals OUTP and OUTN are then sent to a data slicer 106, so as to retrieve a digital signal in the NRZI format.

In the prior art, the equalizer in front of the receiver always operates using a fixed long T as its observation unit. The low pass effect of the transmission cable 3 results in bad compensation effect for the high frequency signals by the equalizer. Moreover, when both the equalizer and the baseline wander compensator are enabled for operation, the compensation effects from them may cancel with each other.

In view of the fact that the baseline wander effect occurs while the transmission cable 3 transmits normal data, always enabling the baseline wander compensator in the receiver 2 is not proper nor efficient. Since the idle pattern is "111 . . . 111 . . . ", the transmission signal of them generated by the scrambler is sufficient random so that the baseline wander phenomenon is not likely to happen.

Figure 4:
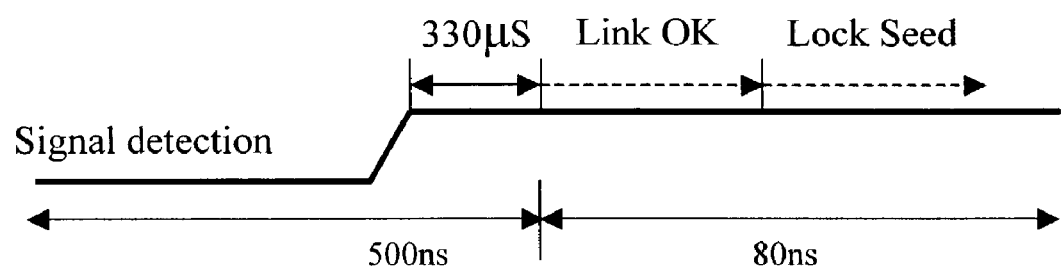
FIG. 4 is a schematic view of the observation unit during the connection process according to the present invention.

With reference to FIG. 4, the adaptive equalizer 10 is always enabled during the link procedure. During the 330 μsec, from the MLT3 idle period to the time when the incoming signals are detected, the adaptive equalizer 10 uses the long T as its observation unit to facilitate observing the signals transmitted over the transmission cable. During 330 μsec after the incoming signals are detected, the adaptive equalizer 10 uses the short T as its observation unit. At the same time, the baseline wander compensator 20 is enabled. This can effectively increase the adaptive equalizer's ability in compensating high and low frequency gains. Since both the adaptive equalizer 10 and the baseline wander compensator 20 use the same short T as their observation unit, the drawback of compensation cancellation effect can be improved.

In the above embodiment, the switch timing for the adaptive equalizer 10 using a long T or a short T as observation unit is 330 μsec after the incoming signals are detected. This 330 μsec is roughly the time for the linking between the receiving and the transmission end specified by the IEEE 802.3 standards. However, the invention is not limited by the switching time. The adaptive equalizer 10 of this invention uses a long T as its observation unit before the connection is established on the transmission cable 3, while uses a short T as its observation unit once the transmission cable 3 starts to transmit data normally. This can increase the compensation efficiency of the adaptive equalizer 10 and avoids the drawback of the cancellation with the compensation effect from the baseline wander compensator 20.

Figure 1:
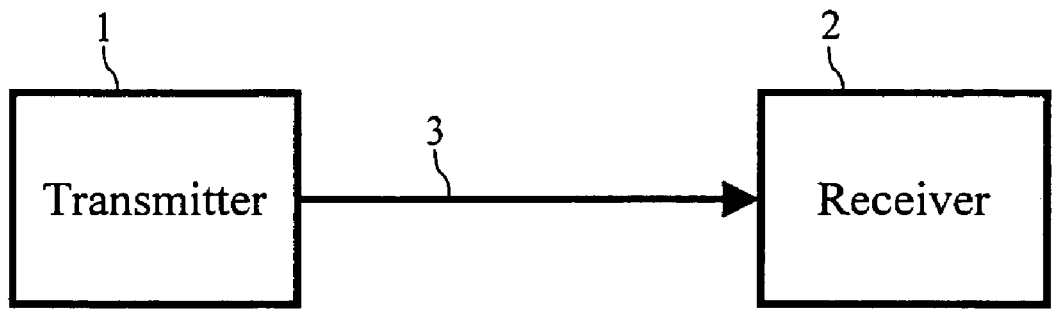
FIG. 1 shows a structure of the data transmission in a conventional wire communication device.
Figure 1:
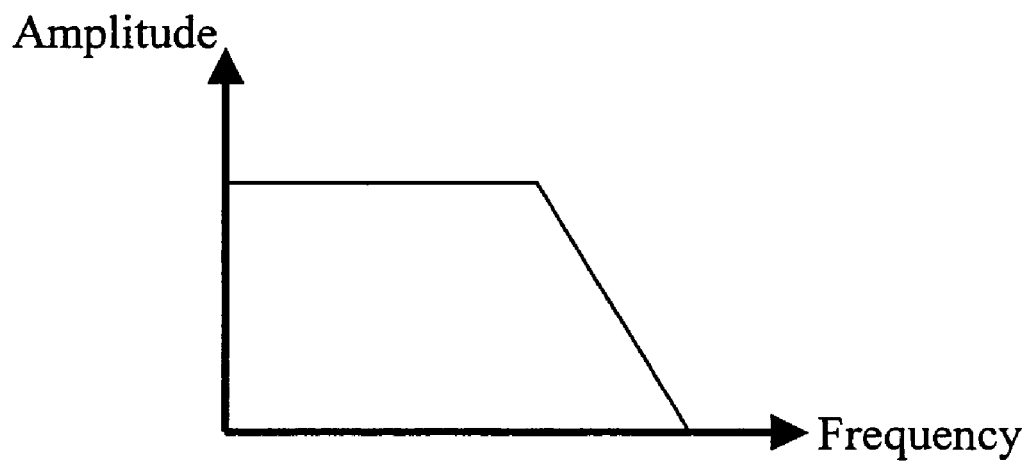
Figure 2:
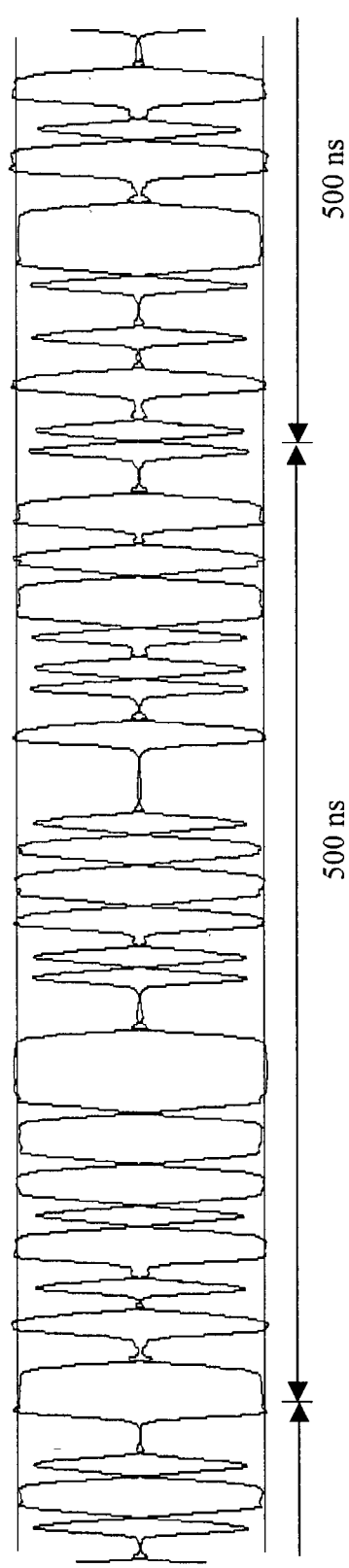
FIG. 2 shows the signal waveform when a conventional equalizer uses a long T as its observation unit.
Figure 5:
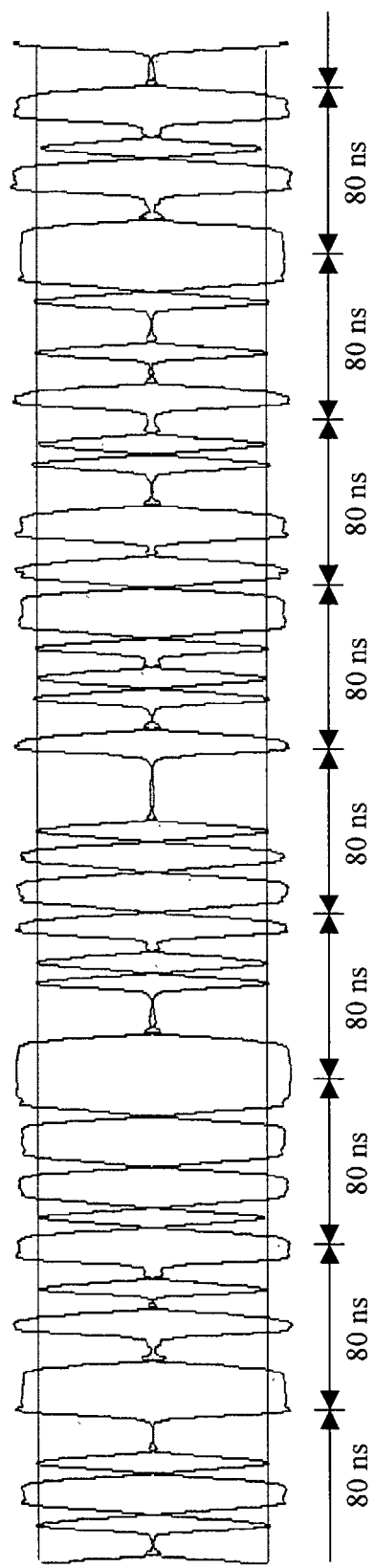
FIG. 5 is a signal waveform diagram when the invention uses a short T as its observation unit according to present the invention.

As shown in FIG. 5, one can clearly see that the high frequency part of the output signals 105 OUTP and OUTN is enhanced and obtains sufficient compensations.

With further reference to the circuit block diagram shown in FIG. 3, the baseline wander compensator 20 receives the indication signal 104 from the peak detector 101 to improve the baseline wander effect of the transmission cable. In a preferred embodiment of the invention, the baseline wander compensator 20 is enabled for operation after 330 μsec following the incoming signals being detected. It uses the short T as its observation unit and determines whether the signal should be compensated according to the indication signal 104. In another embodiment of the invention, as shown in FIG. 4, if the receiver is disliked during the transmission cable link procedure, the baseline wander compensator 20 will be shut down to restart the link mechanism. The compensation method of the disclosed receiver is disclosed in the following paragraphs.

After the 330 μsec following the incoming signals being detected, the adaptive equalizer 10 and the baseline wander compensator 20 are both enabled for operation and use the short T as their observation unit. After the incoming signals RXIP and RXIN are detected by the peak detector 101, if the indication signal 104 indicates that the amplitude does not exceed a predetermined threshold, the adaptive equalizer 10 increases the gain to compensate for the incoming signals RXIP and RXIN. If the indication signal 104 indicates that both the upper and lower side of the amplitude exceed the predetermined threshold, the adaptive equalizer 10 decreases the gain for the incoming signals RXIP and RXIN. If the indication signal 104 indicates that the amplitude does not reach the predetermined threshold at only one side, then the baseline wander compensator 20 performs compensation for the signals. The compensated waveforms of the output signals OUTP and OUTN according to the present invention are shown in FIG. 5.

Figure 6:
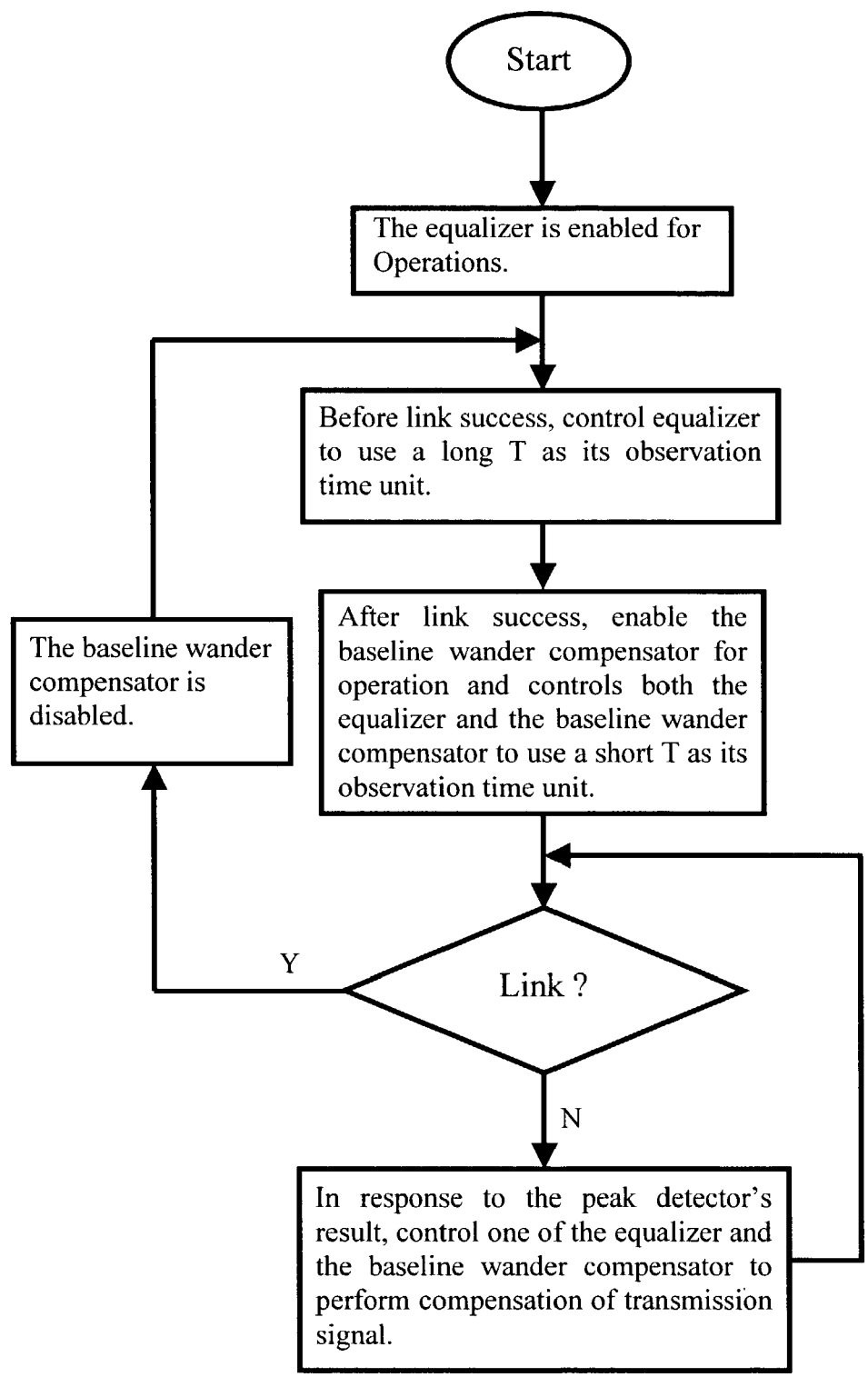
FIG. 6 is a flowchart of the connection process according to the present invention.

FIG. 6 shows the flowchart of the compensation method of the invention during the link procedure. In a preferred embodiment of the invention, an adaptive equalizer 10 and a baseline wander compensator 20 are selectively enabled at the receiving end of a transmission cable to compensate for the attenuation of signals sent by the transmission cable 3. In the link procedure for the transmission cable 3, the compensation method includes the following steps.

First, the adaptive equalizer 10 is always enabled for operations. During the idle period or the unlinked period for the transmission cable, the adaptive equalizer 10 is controlled to use a long T as its observation time unit. During the linked period or the period that the transmission cable normally transmits data, the adaptive equalizer 10 selects a short T as its observation unit and the baseline wander compensator 20 is enabled for operation by also using the short T as the observation unit. If the link procedure fails, then the baseline wander compensator 20 is disabled and the link procedure restarts. After the link is established, it is necessary to lock the seed code; otherwise the data signals cannot be properly received. If the link procedure fails, the link procedure has to be restarted again. When the transmission cable starts to transmit data, both the adaptive equalizer 10 and the baseline wander compensator 20 use the short T as the observation unit. A data signal is compensated either by the adaptive equalizer 10 or the baseline wander compensator 20 in response to the measured or observation results provided by a peak detector.

The peak detector predetermines several thresholds. If the peak detector indicates that the upper and lower amplitudes of the data signal do not reach the thresholds, then the adaptive equalizer 10 increases the gain for the signal compensation. If the peak detector indicates that the upper and lower amplitudes of the data signal exceed the thresholds, then the adaptive equalizer 10 decreases the gain for the signal compensation. If the peak detector indicates that only one of the upper and the lower amplitudes of the data signal does not reach the predetermined thresholds, then the baseline wander compensator 20 compensates for the offset.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention. For example, in an embodiment of the invention, the switching time for the adaptive equalizer 10 in front of the receiver to use a long T or a short T as the observation unit is around 330 μsec after incoming signals are detected. This complies with the time defined by the IEEE 802.3 standards.

Effects of the Invention

The disclosed receiver at the receiving end of a transmission cable can conquer problems that there is signal attenuation or degradation in a conventional wire communication system and that the simultaneous use of the equalizer and the baseline wander compensator may cancel the compensation effects with each other.

The adaptive equalizer uses a long T to observe signals when the transmission cable is idle, but both the adaptive equalizer and the baseline wander compensator are enabled to use a short T for observation when the transmission cable is transmitting normal data signals. The invention can improve the compensation effects on the high and low frequency signals by the adaptive equalizer and the efficiency of the baseline wander compensator. However, it avoids the drawback of possible cancellation between the two compensation effects.

What is claimed is:

1. A receiver for receiving a transmission signal through a transmission cable, comprising an adaptive equalizer and a baseline wander compensator, said adaptive equalizer having a peak detector and an equalizer, said peak detector being adapted to use a first predetermined time unit for observation during an unlinked period and being adapted to use a second predetermined time unit shorter than said first predetermined time unit for observation during a linked period, wherein both said equalizer and said baseline wander compensator are simultaneously enabled during said second predetermined time unit, and either of said equalizer and said baseline wander compensator performs compensation of the transmission signal in response to an observation result of said peak detector during said second predetermined time unit.

2. The receiver of claim 1, wherein the first predetermined time unit is 500 ns and the second predetermined time unit is 80 ns.

3. The receiver of claim 1, wherein the peak detector predetermines several thresholds for detecting amplitudes of the transmission signal.

4. The receiver of claim 3, wherein the equalizer increases a gain to compensate for the transmission signal when an indication signal of the peak detector indicates both an upper amplitude and a lower amplitude of the transmission signal do not reach predetermined thresholds.

5. The receiver of claim 4, wherein said adaptive equalizer further comprises a gain controller for controlling the gain for compensation in response to the indication signal of the peak detector.

6. The receiver of claim 3, wherein the equalizer decreases a gain to compensate for the transmission signal when both the upper amplitude and the lower amplitude of the transmission signal are detected to exceed the predetermined thresholds by the peak detector.

7. The receiver of claim 3, wherein when the peak detector indicates that only one of the upper and lower amplitudes of the transmission signal does not reach the predetermined threshold, said baseline wander compensator compensates for the transmission signal.

* * * * *